(12) United States Patent
Sigvaldason

(10) Patent No.: US 10,306,328 B2
(45) Date of Patent: *May 28, 2019

(54) SYSTEMS AND METHODS FOR RENDERING TEXT ONTO MOVING IMAGE CONTENT

(71) Applicant: Dotsub Inc., New York, NY (US)

(72) Inventor: Thor Sigvaldason, Washington, DC (US)

(73) Assignee: DotSUB Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/943,305

(22) Filed: Apr. 2, 2018

(65) Prior Publication Data

US 2018/0227642 A1 Aug. 9, 2018

Related U.S. Application Data

(63) Continuation of application No. 15/397,139, filed on Jan. 3, 2017, now Pat. No. 9,936,259, which is a
(Continued)

(51) Int. Cl.
| | |
|---|---|
| *H04N 7/16* | (2011.01) |
| *H04N 21/488* | (2011.01) |
| *G11B 27/10* | (2006.01) |
| *H04N 7/173* | (2011.01) |
| *H04N 21/235* | (2011.01) |
| *H04N 21/2543* | (2011.01) |
| *H04N 21/258* | (2011.01) |
| *H04N 21/431* | (2011.01) |
| *H04N 21/435* | (2011.01) |

(Continued)

(52) U.S. Cl.
CPC ......... *H04N 21/4888* (2013.01); *G11B 27/10* (2013.01); *H04N 7/17318* (2013.01); *H04N 21/235* (2013.01); *H04N 21/2355* (2013.01); *H04N 21/23418* (2013.01); *H04N 21/2541* (2013.01); *H04N 21/25435* (2013.01); *H04N 21/25891* (2013.01); *H04N 21/262* (2013.01); *H04N 21/4126* (2013.01); *H04N 21/435* (2013.01); *H04N 21/4312* (2013.01); *H04N 21/4314* (2013.01); *H04N 21/440218* (2013.01); *H04N 21/458* (2013.01); *H04N 21/4627* (2013.01); *H04N 21/4788* (2013.01); *H04N 21/47211* (2013.01); *H04N 21/4884* (2013.01); *H04N 21/6582* (2013.01); *H04N 21/8355* (2013.01); *H04N 21/8456* (2013.01); *H04N 21/85406* (2013.01)

(58) Field of Classification Search
CPC .................................................. H04N 21/4888
See application file for complete search history.

(56) References Cited

U.S. PATENT DOCUMENTS 8,863,220 B2 * 10/2014 Sigvaldason .......... G11B 27/10 704/2
9,373,359 B2 * 6/2016 Sigvaldason .......... G11B 27/10
(Continued)

*Primary Examiner* — Gigi L Dubasky
(74) *Attorney, Agent, or Firm* — Michael D. Lazzara; Leech Tishman Fuscaldo & Lampl

(57) ABSTRACT

A method for rendering text onto moving image content. The method comprises receiving a request to translate dialog associated with moving image content, transmitting an interface, transmitting a time-stamped transcription, and receiving a translation of the dialog.

17 Claims, 7 Drawing Sheets

Related U.S. Application Data continuation of application No. 14/789,515, filed on Jul. 1, 2015, now Pat. No. 9,538,252, which is a continuation of application No. 13/366,743, filed on Feb. 6, 2012, which is a continuation of application No. 13/166,208, filed on Jun. 22, 2011, now Pat. No. 8,863,220, which is a continuation of application No. 11/368,647, filed on Mar. 6, 2006.

(51) Int. Cl.

| | | |
|---|---|---|
| *H04N 21/472* | (2011.01) | |
| *H04N 21/4788* | (2011.01) | |
| *H04N 21/658* | (2011.01) | |
| *H04N 21/8355* | (2011.01) | |
| *H04N 21/234* | (2011.01) | |
| *H04N 21/254* | (2011.01) | |
| *H04N 21/262* | (2011.01) | |
| *H04N 21/41* | (2011.01) | |
| *H04N 21/4402* | (2011.01) | |
| *H04N 21/458* | (2011.01) | |
| *H04N 21/4627* | (2011.01) | |
| *H04N 21/845* | (2011.01) | |
| *H04N 21/854* | (2011.01) | |

(56) References Cited

U.S. PATENT DOCUMENTS

| | | | | |
|---|---|---|---|---|
| 9,538,252 | B2 * | 1/2017 | Sigvaldason | G11B 27/10 |
| 9,936,259 | B2 * | 4/2018 | Sigvaldason | H04N 21/4888 |
| 2001/0044726 | A1 * | 11/2001 | Li | H04N 5/44543 |
| | | | | 704/277 |
| 2002/0198699 | A1 * | 12/2002 | Greene | G06F 9/454 |
| | | | | 704/2 |
| 2004/0117820 | A1 * | 6/2004 | Thiemann | H04N 7/17318 |
| | | | | 725/37 |
| 2005/0078221 | A1 * | 4/2005 | Kobayashi | H04N 5/278 |
| | | | | 348/600 |
| 2007/0011012 | A1 * | 1/2007 | Yurick | G10L 15/26 |
| | | | | 704/277 |

* cited by examiner

SYSTEMS AND METHODS FOR RENDERING TEXT ONTO MOVING IMAGE CONTENT

CROSS-REFERENCE TO RELATED APPLICATION/PRIORITY CLAIM

The present application is a continuation of U.S. patent application Ser. No. 15/397,139 filed on Jan. 3, 2017, now U.S. Pat. No. 9,936,259, issued on Apr. 3, 2018, which is a continuation of U.S. patent application Ser. No. 14/789,515 filed on Jul. 1, 2015, now U.S. Pat. No. 9,538,252, issued on Jan. 3, 2017, which is a continuation of U.S. patent application Ser. No. 13/366,743, filed on Feb. 6, 2012, now abandoned, which is a continuation of U.S. patent application Ser. No. 13/166,208, filed on Jun. 22, 2011, now U.S. Pat. No. 8,863,220, issued on Oct. 14, 2014, which is a continuation of U.S. patent application Ser. No. 11/368,647, filed on Mar. 6, 2006, now abandoned, and all of which are hereby incorporated by reference into the present application.

BACKGROUND

This application discloses an invention that is related, generally and in various embodiments, to systems and methods for rendering text onto moving image content.

Current processes for rendering text (e.g., subtitles, open captions, closed captions, etc.) onto moving image content are highly fragmented, labor intensive, and generally involve a plurality of contributors operating offline in a piecemeal manner. The current processes tend to be relatively inefficient and expensive, and as a result, a relatively small amount of moving image content having text rendered thereon is made available for viewing.

SUMMARY

In one general respect, this application discloses a method for rendering text onto moving image content. According to various embodiments, the method comprises receiving a request to translate dialog associated with moving image content, transmitting an interface, transmitting a time-stamped transcription, and receiving a translation of the dialog.

According to other embodiments, the method comprises transmitting a request to translate dialog associated with moving image content, receiving an interface, receiving a time-stamped transcription, and transmitting a translation of the dialog.

In another general respect, this application discloses a system for rendering text onto moving image content. According to various embodiments, the system comprises a provider system that comprises a host. The host is configured to receive and transmit moving image content, receive and transmit a transcription of dialog associated with the moving image content, receive time-stamps associated with the transcription, and receive and transmit a translation of the dialog.

According to other embodiments, the system comprises a client system that comprises a client module and a super-imposing module that is configured to superimpose text onto moving image content as the moving image content is received by the client system.

Aspects of the disclosed invention may be implemented by a computer system and/or by a computer program stored on a computer-readable medium. The computer-readable medium may comprise a disk, a device, and/or a propagated signal.

DRAWINGS

Various embodiments of the disclosed invention are described herein by way of example in conjunction with the following figures.

DETAILED DESCRIPTION

It is to be understood that at least some of the figures and descriptions of the disclosed invention have been simplified to illustrate elements that are relevant for a clear understanding of the disclosed invention, while eliminating, for purposes of clarity, other elements. Those of ordinary skill in the art will recognize, however, that these and other elements may be desirable. However, because such elements are well known in the art, and because they do not facilitate a better understanding of the disclosed invention, a discussion of such elements is not provided herein.

Figure 1A:
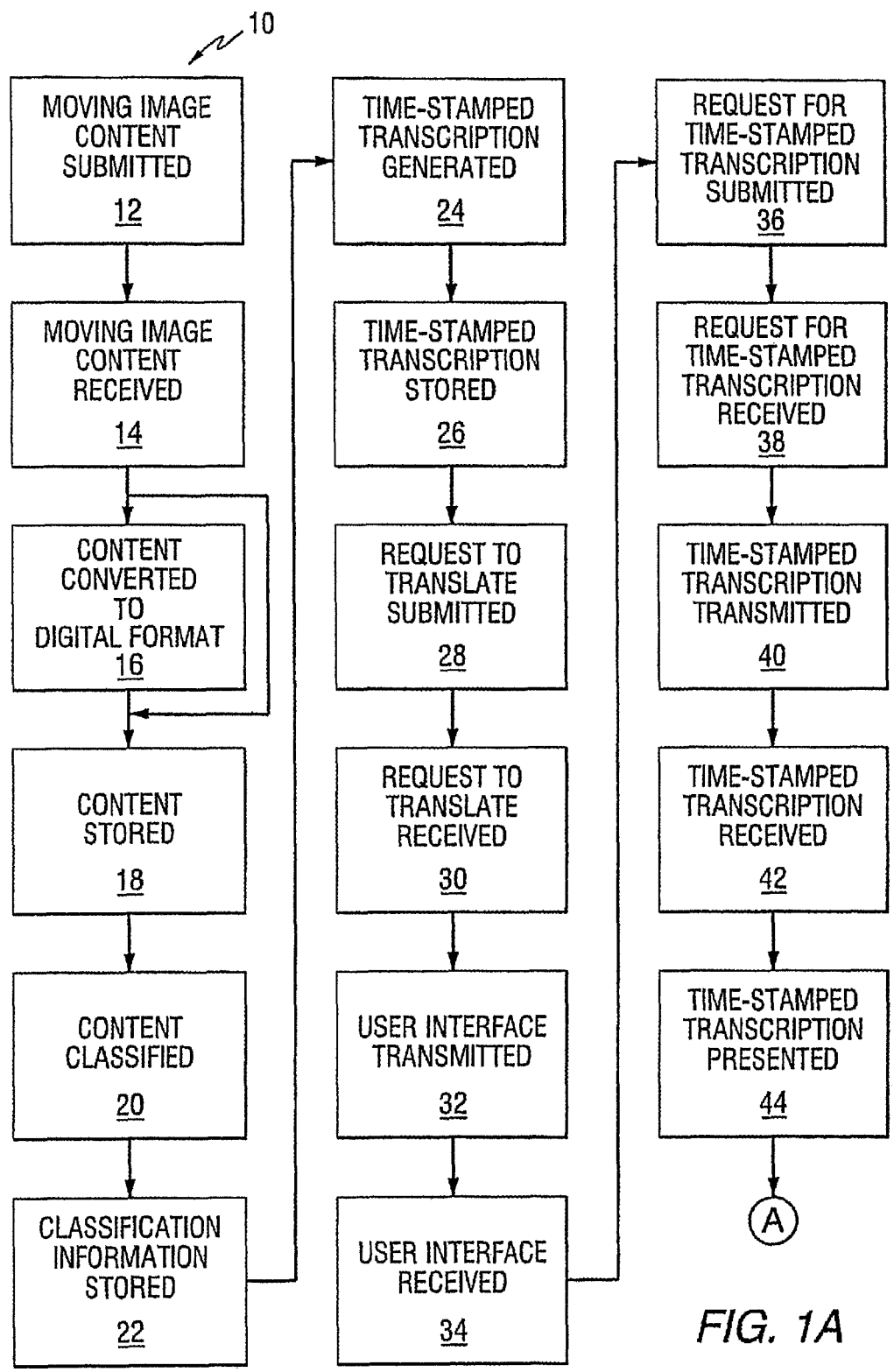
FIGS. 1A-1C illustrate various embodiments of a method for rendering text onto moving image content.
Figure 1B:
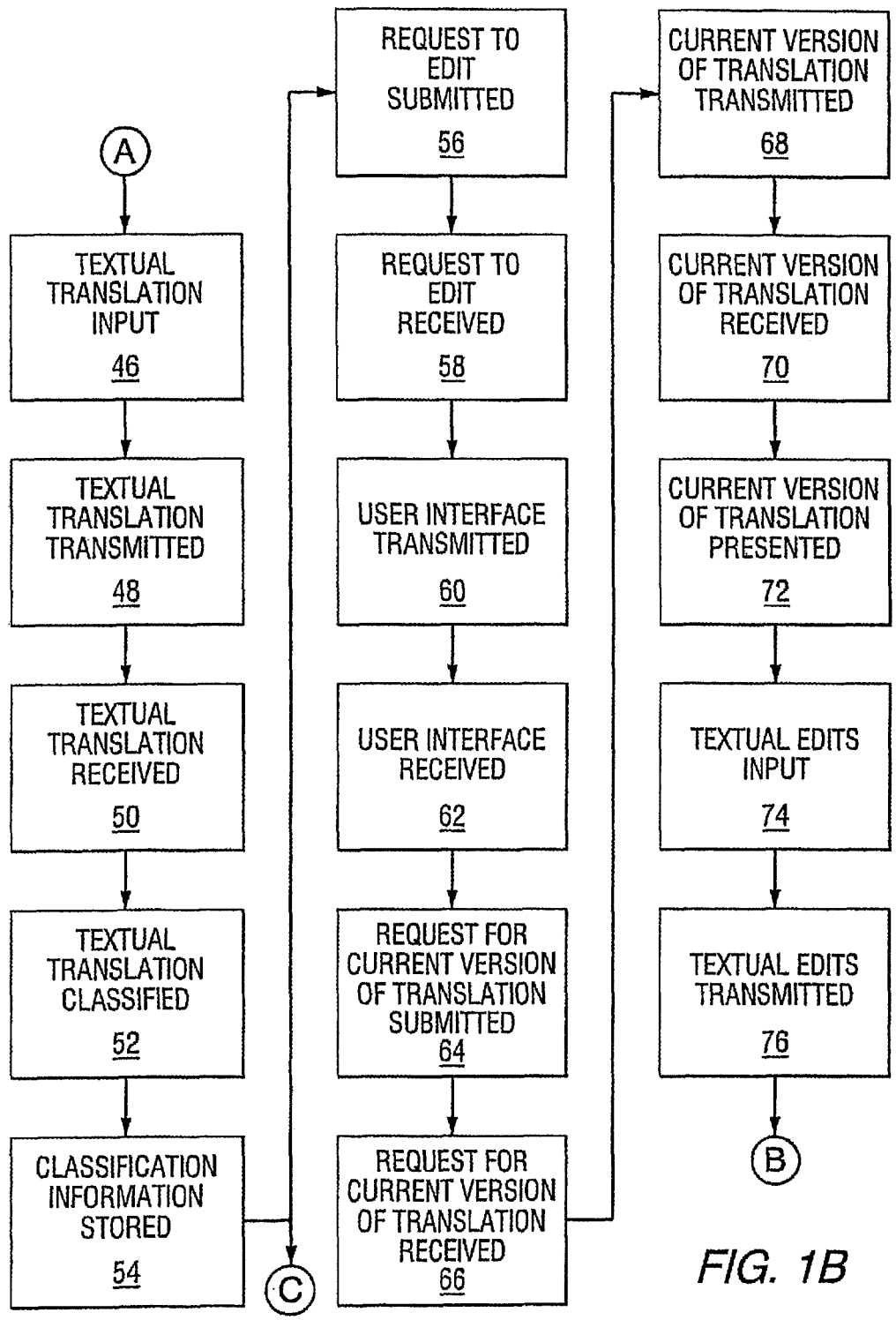
Figure 1C:
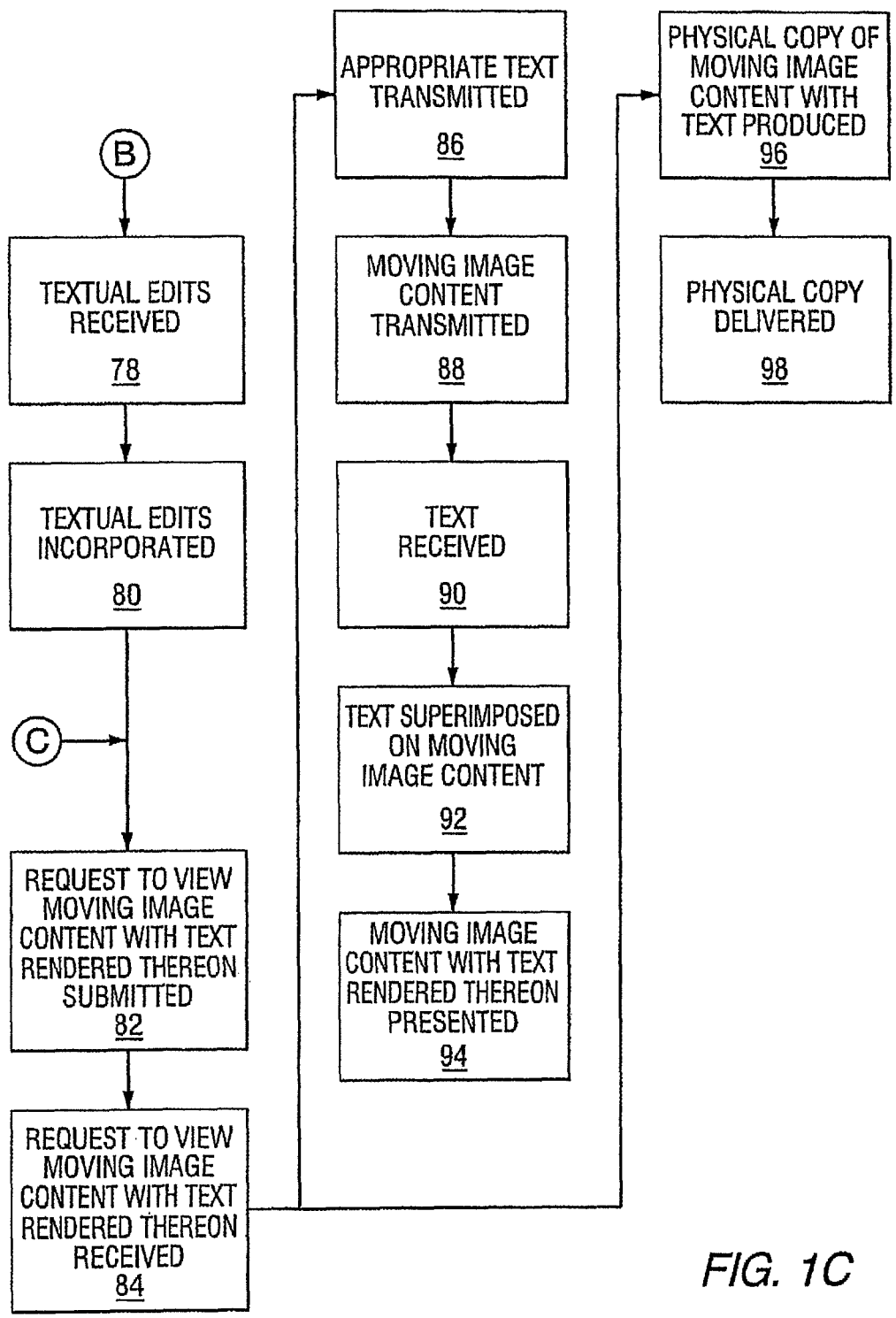

FIG. 1 illustrates various embodiments of a method 10 for rendering text onto moving image content. The moving image content may be any moving image content such as, for example, a full feature film, a movie, a video clip, etc. In various implementations, the method 10 may be implemented at least in part by hardware (e.g., device, computer, computer system, equipment, component, etc.); software (e.g., program, application, instruction set, code, etc.); storage medium (e.g., disk, device, propagated signal, etc.); or a combination thereof. It should be noted, however, that the method 10 may be performed in any manner consistent with the aspects of the disclosed invention.

The process begins at block 12, where moving image content (e.g., a movie) is submitted to a provider. The moving image content may be submitted to the provider by anyone in any suitable manner. For example, the moving image content may be submitted by a producer, a director, a distributor, etc. and may be submitted electronically to the provider, mailed to the provider, hand-delivered to the provider, etc. According to various embodiments, a submitter may access a website associated with the provider, and cause the moving image content to be submitted to an IP address associated with the provider.

From block 12, the process advances to block 14, where the provider receives the submitted moving image content. As the moving image content may be submitted in any suitable manner, it follows that the submitted moving image content may be received by the provider in any suitable manner. According to various embodiments, the submitted moving image content is received electronically via a server associated with the provider. From block 14, the process advances to block 16 or to block 18.

If the moving image content received by the provider at block 14 is not in a digital format, the process advances from block 14 to block 16, where the moving image content is converted to a digital format. From block 16, the process advances to block 18, where the moving image content is stored for use as described hereinbelow. According to various embodiments, the moving image content may be stored as a flat file on a medium accessible by a server associated with the provider. If the moving image content received by the provider at block 14 is already in a digital format, the process advances from block 14 to block 18, where the moving image content is stored for use as described hereinbelow. The moving image content stored at block 18 may serve as a master version of the moving image content. The master version may be used to create each different version of the moving image content subsequently viewed.

From block 18, the process advances to block 20, where the moving image content is classified by title, producer, genre, etc. or any combination thereof. The classification information is stored at block 22 for use as described hereinbelow. According to various embodiments, the classification information is stored on a medium accessible by a server associated with the provider. From block 22, the process advances to block 24, where a time-stamped transcription of the original dialog associated with the moving image content is generated. Generally, the time-stamped transcription is in the native language of the original dialog. The process described at block 24 may be completed by the provider or another party, and may be completely manually offline or may be completed online. As used herein, the term "online" refers to being connected to a remote service such as, for example, the Internet. From block 24, the process advances to block 26, where the time-stamped transcription is stored for use as described hereinbelow. According to various embodiments, the time-stamped transcription may be stored as a database file on a medium accessible by a server associated with the provider. The time-stamped transcription may serve as a master version for all subsequent translations of the text associated with the moving image content as described hereinbelow. After the time stamped transcription is stored, the moving image content is ready for text rendering.

From block 26, the process advances to block 28, where a request to translate the time-stamped transcription into another language is submitted to the provider. The request may be submitted by anyone in any suitable manner. For example, the request may be submitted by a professional translator, and may be submitted electronically to the provider, telephoned to the provider, mailed to the provider, hand-delivered to the provider, etc. According to various embodiments, a translator may access a website associated with the provider and cause the request to be submitted to an IP address associated with the provider.

From block 28, the process advances to block 30, where the request to translate is received by the provider. Responsive to the request, an interface is transmitted at block 32 to a client system associated with the person who made the request. From block 32, the process advances to block 34, where the client system receives the interface. From block 34, the process advances to block 36, where the interface is utilized to request a copy of the master version of the time-stamped transcription from the provider. According to various embodiments, the request includes an indication of a particular moving image content (e.g., by the title of the moving image content). The provider receives the request at block 38, and responsive thereto, transmits a copy of the master version of the time-stamped transcription to the client system at block 40.

The client system receives the copy of the time-stamped transcription at block 42, and coordinates the presentation of the time-stamped transcription to the translator at block 44. From block 44, the process advances to block 46, where the translator selects a language other than the language of the original dialog, then inputs text corresponding to the translation of the time-stamped transcription into the selected language. When the translator is finished inputting such text, the translator may cause the textual translation to be transmitted to the provider at block 48. As the textual translation is based on the time-stamped transcript, the textual translation is also time-stamped to correspond with the original dialog. The textual translation is received by the provider at block 50, is classified as to the appropriate language, the start and stop time for each line of text, etc. at block 52, and is stored at block 54 for use as described hereinbelow. The textual translation stored at block 54 represents the text associated with the moving image content. According to various embodiments, the textual translation is stored as a database file on a medium accessible by a server associated with the provider. The process described from block 12 to block 54, or any portion thereof, may be repeated sequentially or concurrently for any number of submitters, any number of translators, and any amount of moving image content.

From block 54, the process advances to block 56 or to block 80. If a translator wishes to edit a current version of a translation, the process advances to block 56, where the translator may submit a request to edit a current version of a translation. The request may be submitted by anyone in any suitable manner. For example, the request may be submitted by a professional translator, and may be submitted electronically to the entity, telephoned to the entity, mailed to the entity, hand-delivered to the entity, etc. According to various embodiments, a translator may access a website associated with the provider and cause the request to be submitted to an IP address associated with the provider.

From block 56, the process advances to block 58, where the request to edit a current version of a translation is received by the provider. Responsive to the request, an interface is transmitted at block 60 to a client system associated with the person who made the request. From block 60, the process advances to block 62, where the client system receives the interface. From block 62, the process advances to block 64, where the interface is utilized to request a copy of the current version of the translation from the provider. The provider receives the request at block 66, and responsive thereto, transmits a copy of the current version of the translation to the client system at block 68.

The client system receives the copy of the current version of the translation at block 70, and coordinates the presentation of the current version of the translation to the translator at block 72. From block 72, the process advances to block 74, where the translator inputs the text corresponding to the edits of the translation. When the translator is finished inputting such edits, the translator may cause the edits to be transmitted to the provider at block 76. As the edits are based on the current version of the translation, which is based on the time-stamped transcript, the edits are also time-stamped to correspond with the original dialog. The edits are received by the provider at block 78, and the edits are incorporated to the current stored version of the translation at block 80. The edit process described from block 56 to block 80, may be repeated sequentially or concurrently for any number of translators, for any number of translations, for any amount of moving image content.

Following block 80, or block 54 if a translator does not wish to edit a current version of a translation, the process advances to block 82, where a viewer may request to view the moving image content with text rendered thereon in a particular language. According to various embodiments, a viewer may access a website associated with the provider, and cause the request to be submitted to an IP address associated with the provider. The provider receives the request at block 84. From block 84, the process may advance to block 86 or block 96.

If the request received at block 84 is a request to view the moving image content via a client system, the process advances from block 84 to block 86, where the provider transmits the appropriate text to the client system, then transmits the requested moving image content at block 88 to the client system. According to various embodiments, the text transmitted at block 86 may also include text in any number of other languages. At block 90, the client system receives the text, then superimposes the particular text on the moving image content as the moving image content is received at block 92. Therefore, the text is rendered onto the moving image content dynamically. The client system coordinates the presentation of the moving image content with the text rendered thereon to the viewer at block 94. The process described at blocks 82-94 may be repeated sequentially or concurrently for any number of viewers for any amount of moving image content in any number of languages.

If the request received at block 84 is a request to view the moving image content from a physical medium such as, for example, a digital video disk (DVD), the process advances from block 84 to block 96, where the provider utilizes the master version of the moving image content and the current version of the appropriate text to produce a physical copy of the moving image content complete with the appropriate text. According to various embodiments, the physical medium may include text in any number of languages. From block 96, the process advances to block 98, where the provider delivers or arranges for the delivery of the physical copy to the viewer. Once the viewer receives the physical copy, the viewer may view the physical copy in a suitable manner.

From the foregoing, it will be appreciated by one skilled in the art that the above-described method 10 may be utilized by multiple people to work on the same or different moving image content, in the same or different language, at the same or different time, separately, collectively, or any combination thereof. The method 10 may be utilized to increase the scope of what moving image content can be made available with text rendered thereon and to lower the cost associated with such offerings. It will also be appreciated that according to various embodiments, instead of the steps of the method 10 being performed sequentially as described hereinabove, many of the steps can be performed concurrently.

According to various embodiments, the provider may charge a fee to the person/entity who originally submits the moving image content. The provider may also charge a fee to the viewer for providing the moving image content with the text rendered thereon in a given language. According to various embodiments, the moving image content may be provided on a pay-per-view basis, and the provider may share a portion of the revenues generated by the pay-per-view with the appropriate translator or translators. For embodiments where a physical copy of the moving image content is provided to the viewer, the provider may share a portion of the revenues generated by the sale of the physical copy with the appropriate translator or translators. According to various embodiments, the translators may charge the provider and/or the submitter a fee for translating the dialog. According to other embodiments, the translators may provide the translations for free as a public service.

Figure 2:
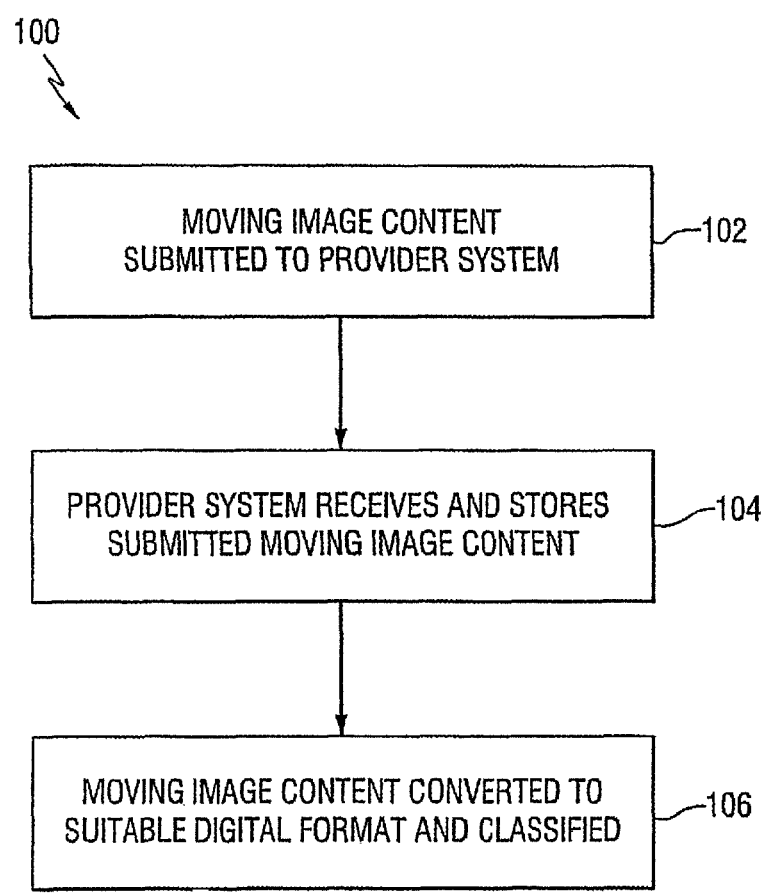
FIG. 2 illustrates various embodiments of a method for submitting moving image content to a provider.
Figure 3:
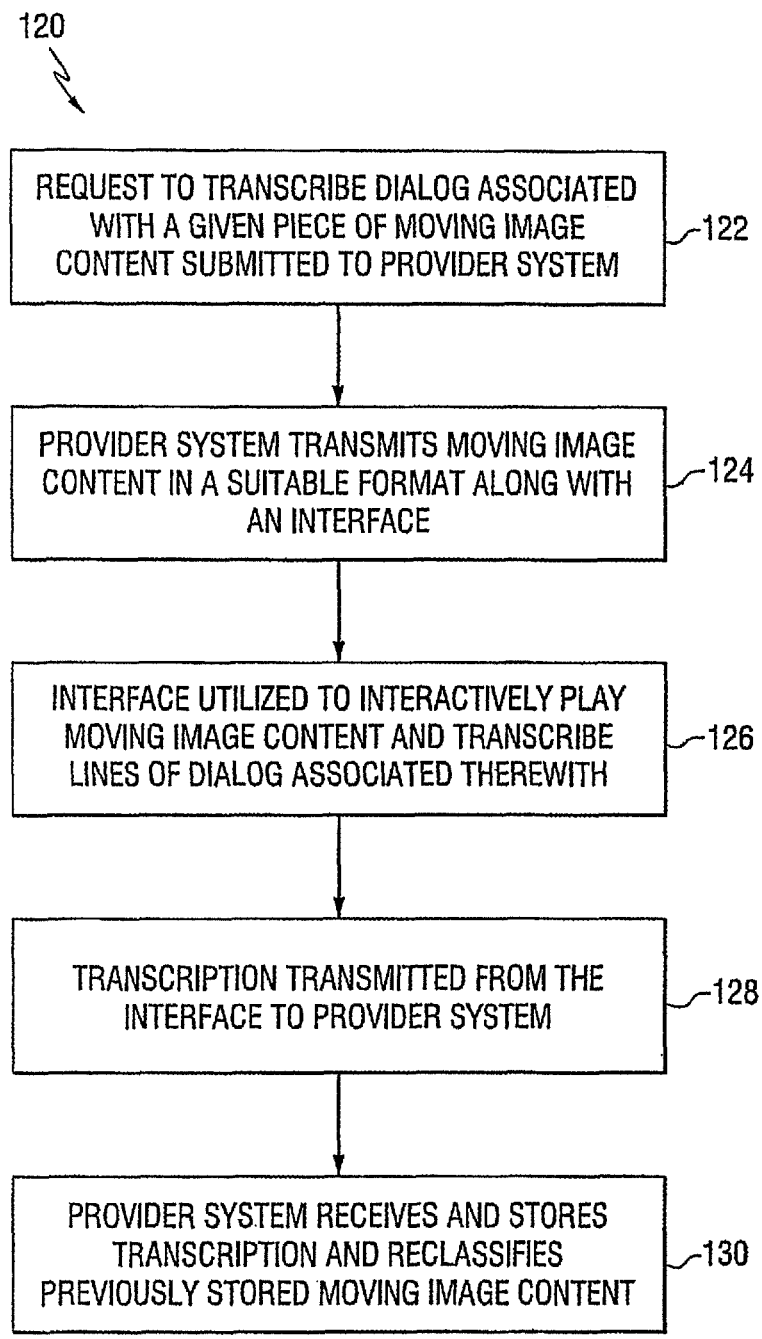
FIG. 3 illustrates various embodiments of a method for transcribing dialog associated with moving image content.
Figure 4:
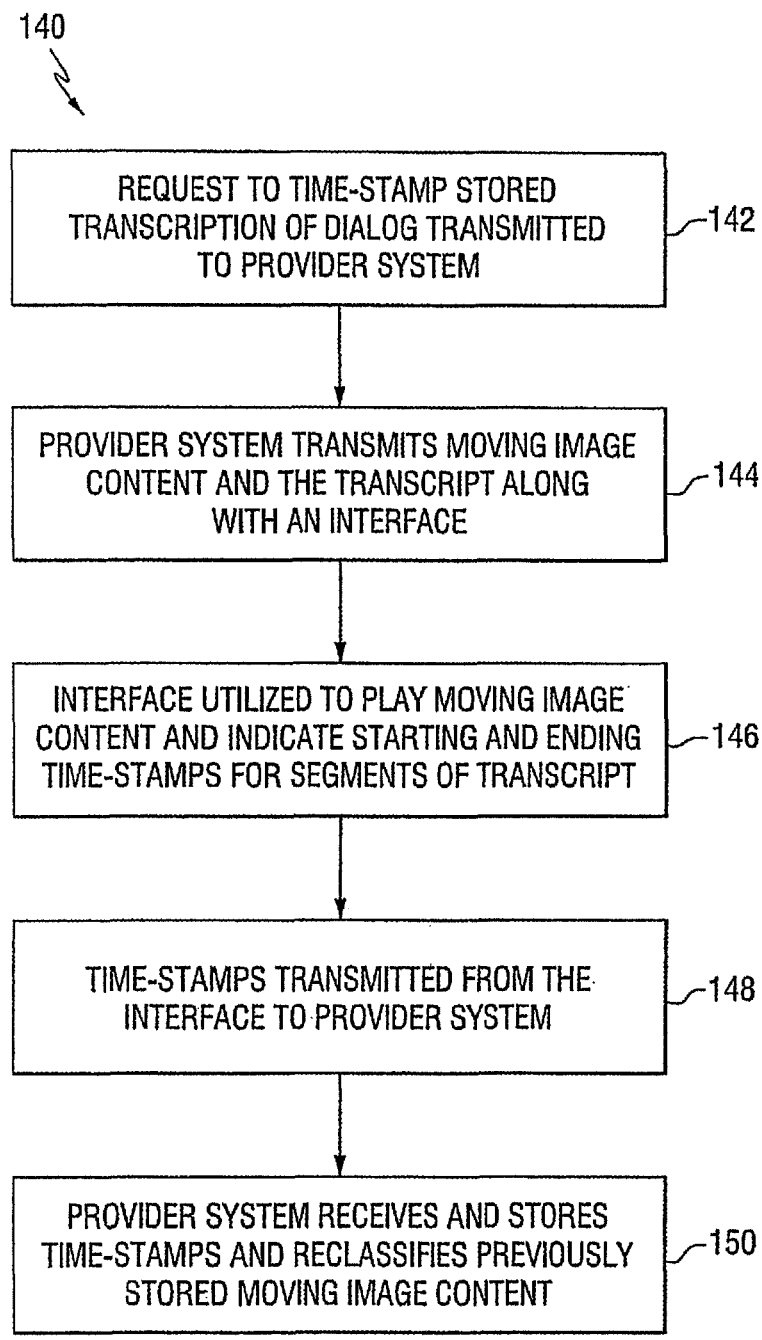
FIG. 4 illustrates various embodiments of a method for time-stamping a transcription of dialog.

According to various embodiments, the submission of moving image content, the transcription of the dialog associated with moving image content, and the time-stamping of the transcription may be accomplished online as described with respect to FIGS. 2-4.

FIG. 2 illustrates various embodiments of a method 100 for submitting moving image content to a provider. The process begins at block 102, where a submitter utilizes a client module residing at a client system to electronically submit moving image content (e.g., a movie) to a provider system. As used herein, the term "client module" refers to any type of software application that may be utilized to access, interact with, and view content associated with various Internet resources. From block 102, the process advances to block 104, where the provider system receives and stores the submitted moving image content. The moving image content stored at block 104 may serve as a master version of the moving image content, and may be used to create each different version of the moving image content subsequently viewed. From block 104, the process advances to block 106, where the provider system converts the stored moving image content to a digital format suitable for interactive work, and classifies the formatted moving image content as "not transcribed."

FIG. 3 illustrates various embodiments of a method 120 for transcribing dialog associated with moving image content. The process begins at block 122, where a transcriber utilizes a client module residing at a client system to submit a request to a provider system, where the request is a request to transcribe dialog associated with a given piece of moving image content stored by the provider system (e.g., the moving image content stored at block 106 of FIG. 2). From block 122, the process advances to block 124, where the provider system receives the request, and responsive thereto, transmits the requested moving image content in a suitable format along with an interface (e.g., HTML and Flash) to the client system. From block 124, the process advances to block 126, where the client system receives the moving image content and the interface, and the transcriber utilizes the interface to interactively play the moving image content and transcribe lines of dialog associated therewith. From block 126, the process advances to block 128, where the transcriber causes the transcription to be electronically transmitted from the interface to the provider system. From block 128, the process advances to block 130, where the provider system receives and stores the transcription, and reclassifies the previously stored moving image content as "transcribed but not time-stamped."

FIG. 4 illustrates various embodiments of a method 140 for time-stamping a transcription of dialog associated with a given piece of moving image content. The process begins at block 142, where a time-stamper utilizes a client module residing at a client system to submit a request to a provider system, where the request is a request to time-stamp a stored transcription of dialog associated with a given piece of stored moving image content. (e.g., the transcript stored at block 130 of FIG. 3 and the moving image content stored at block 106 of FIG. 2). From block 142, the process advances to block 144, where the provider system receives the request, and responsive thereto, transmits the moving image content and the transcript along with an interface to the client system. From block 144, the process advances to block 146, where the client system receives the moving image content, the transcript and the interface, and the time-stamper utilizes the interface and its interactive elements (e.g., dialog begins button, dialog ends button, play clock, etc.) to play the moving image content and indicate starting and ending time-stamps for each segment of the transcript. From block 146, the process advances to block 148, where the time-stamper causes the time-stamps to be electronically transmitted from the interface to the provider system. From block 148, the process advances to block 150, where the provider system receives and stores the time-stamps, and reclassifies the previously stored moving image content as "transcribed and time-stamped." At this point, the dialog associated with the moving image content is ready for subsequent translating.

Figure 5:
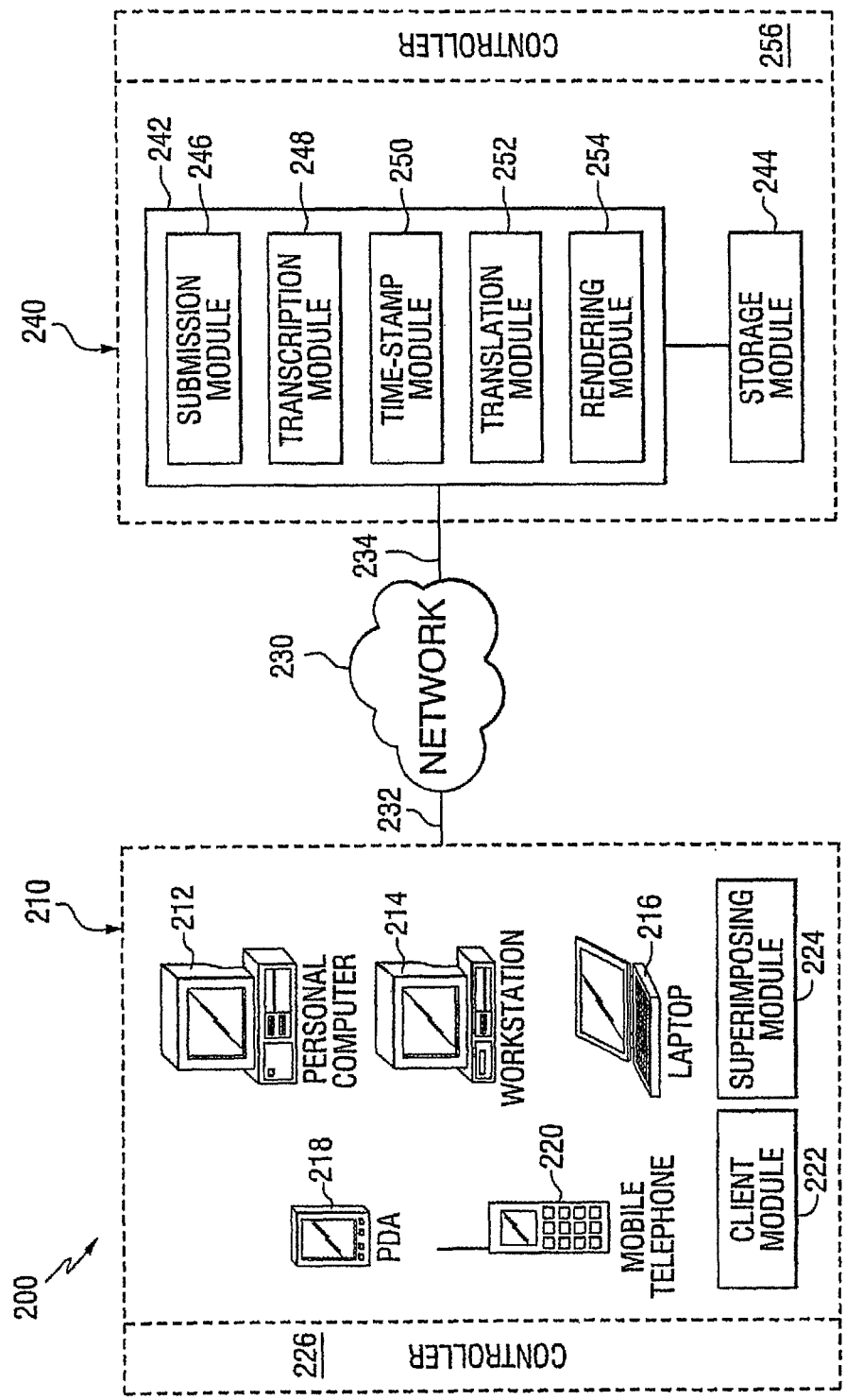
FIG. 5 illustrates various embodiments of a system for rendering text onto moving image content.

FIG. 5 illustrates various embodiments of a system 200 for rendering text onto moving image content. In general, one or more elements of the system 200 may perform the method 10 described hereinabove.

As shown, the system 200 includes a client system 210 for presenting information to and receiving information from a user. The client system 210 may include one or more client devices such as, for example, a personal computer (PC) 212, a workstation 214, a laptop computer 216, a network-enabled personal digital assistant (PDA) 218, and a network-enabled mobile telephone 220. Other examples of a client device include, but are not limited to a server, a microprocessor, an integrated circuit, fax machine or any other component, machine, tool, equipment, or some combination thereof capable of responding to and executing instructions and/or using data.

According to various embodiments, the client system 210 may include a client module 222, and a superimposing module 224 for superimposing text onto the moving image content as the moving image content is received by the client system 210. As explained previously, the client module 222 may be utilized to access, interact with, and view content associated with various Internet resources. The client system 210 may also include Macromedia Flash Player, and the superimposing module 224 may be embodied, for example, as a Flash plug-in.

The modules 222-224 may be implemented utilizing any suitable computer language (e.g., C, C++, Java, JavaScript, Visual Basic, VBScript, Delphi, etc.) and may be embodied permanently or temporarily in any type of machine, component, physical or virtual equipment, storage medium, or propagated signal capable of delivering instructions to a device. The modules 222-224 may be stored on a computer-readable medium (e.g., disk, device, and/or propagated signal) such that when a computer reads the medium, the functions described herein are performed. According to various embodiments, the modules 222-224 may be installed on separate, distinct client devices and may be administered by different entities. Also, different functional aspects of the modules 222-224 may be installed on separate, distinct client devices.

In various implementations, the client system 210 operates under the command of a client controller 226. The broken lines are intended to indicate that in some implementations, the client controller 226, or portions thereof considered collectively, may instruct one or more elements of the client system 210 to operate as described. Examples of a client controller 226 include, but are not limited to a computer program, a software application, computer code, set of instructions, plug-in, applet, microprocessor, virtual machine, device, or combination thereof, for independently or collectively instructing one or more client devices to interact and operate as programmed.

The client controller 226 may be implemented utilizing any suitable computer language (e.g., C, C++, Java, JavaScript, Visual Basic, VBScript, Delphi, Flash/Actionscript, etc.) and may be embodied permanently or temporarily in any type of machine, component, physical or virtual equipment, storage medium, or propagated signal capable of delivering instructions to a device. The client controller 226 (e.g., software application, computer program) may be stored on a computer-readable medium (e.g., disk, device, and/or propagated signal) such that when a computer reads the medium, the functions described herein are performed.

In general, the client system 210 may be connected through a network 230 having wired or wireless data pathways 232, 234 to provider system 240. Although only one client system 210 is shown in FIG. 2, it is understood that any number of client systems 210 may be connected to the provider system 240 via the network 230. The network 230 may include any type of delivery system including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 230 may include elements, such as, for example, intermediate nodes, proxy servers, routers, switches, and adapters configured to direct and/or deliver data.

In general, the client system 210 and the provider system 240 each include hardware and/or software components for communicating with the network 230 and with each other. The client system 210 and provider system 240 may be structured and arranged to communicate through the network 230 using various communication protocols (e.g., HTTP, TCP/IP, UDP, WAP, WiFi, Bluetooth) and/or to operate within or in concert with one or more other communications systems.

The provider system 240 generally hosts a set of resources. As shown, the provider system 240 includes a host 242, and may include data storage means 244 (e.g., storage arrays, disks, devices, etc.) in communication with the host 242. The host 242 may be implemented by one or more servers (e.g., IBM® OS/390 operating system servers, Linux operating system-based servers, Windows NT™ servers) providing one or more assets (e.g., data storage, applications, etc.). According to various embodiments, the host 242 may be configured to perform one or more of the following functions: receiving and transmitting moving image content, receiving and transmitting a transcription of dialog associated with the moving image content, receiving time-stamps associated with the transcription, and receiving and transmitting a translation of the dialog. According to various embodiments, the functionality of the host 242 may be implemented by more than one host. For such embodiments, the various hosts are configured to collaborate with one another to perform the method 10 described hereinabove.

According to various embodiments, the functionality of the host 242 may be implemented by one or more modules that comprise the host 242. For example, according to various embodiments, a submission module 246 may be configured to manage the process of receiving and storing moving image content. A transcription module 248 may be configured to manage the process of transcribing original dialogs associated with moving image content. A time-stamp module 250 may be configured to manage the process of time-stamping transcriptions of dialogs associated with moving image content. A translation module 252 may be configured to manage the process of translating time-stamped transcriptions of dialogs associated with moving image content into different languages. A rendering module 254 may mange the process of retrieving stored moving image content, transcriptions thereof, and time-stamped transcriptions and translations thereof, and transmitting the moving image content, transcripts, time-stamped transcripts, and translations. In various embodiments, the modules 246-254 are configured to collaborate with one another to perform the method 10 described hereinabove.

The modules 246-254 may be implemented utilizing any suitable computer language (e.g., C, C++, Java, JavaScript, Visual Basic, VBScript, Delphi, etc.) and may be embodied permanently or temporarily in any type of machine, component, physical or virtual equipment, storage medium, or propagated signal capable of delivering instructions to a device. The modules 246-254 may be stored on a computer-readable medium (e.g., disk, device, and/or propagated signal) such that when a computer reads the medium, the functions described herein are performed. Although the modules 246-254 are shown in FIG. 5 as part of the host 242, according to various embodiments, the modules 246-254 may be installed on separate, distinct hosts and may be administered by different entities. Also, different functional aspects of the modules 246-254 may be installed on separate, distinct hosts.

In various implementations, the provider system 240 operates under the command of a provider controller 256. The broken lines are intended to indicate that in some implementations, the provider controller 256, or portions thereof considered collectively, may instruct one or more elements of provider system 240 to operate as described. Examples of a provider controller 256 include, but are not limited to a computer program, a software application, computer code, set of instructions, plug-in, microprocessor, virtual machine, device, or combination thereof, for independently or collectively instructing one or more computing devices to interact and operate as programmed.

In general, the provider controller 256 may be implemented utilizing any suitable algorithms, computing language (e.g., C, C++, Java, JavaScript, Perl, Visual Basic, VBScript, Delphi, SQL, PHP, etc.) and may be embodied permanently or temporarily in any type of computer, computer system, device, machine, component, physical or virtual equipment, storage medium, or propagated signal capable of delivering instructions. The provider controller 256 when implemented as software or a computer program, for example, may be stored on a computer-readable medium (e.g., device, disk, or propagated signal) such that when a computer reads the medium, the functions described herein are performed. It will be appreciated that, to perform one or more of the above-described functions, a single component described herein may be replaced by multiple components, and multiple components described herein may be replaced by a single component.

While several embodiments of the invention have been described, it should be apparent, however, that various modifications, alterations and adaptations to those embodiments may occur to persons skilled in the art with the attainment of some or all of the advantages of the invention. For example, it will be appreciated that the method 10 can be adapted to allow for an audio translation of the original dialog to be generated in a variety of languages, stored, for example, in an MPEG format, and transmitted as an audio stream to be presented concurrently with the moving image content. This audio process may utilized in lieu of or in addition to the text rendering process described hereinabove.

This application is therefore intended to cover all such modifications, alterations and adaptations without departing from the scope and spirit of the disclosed invention as defined by the appended claims.

What is claimed is:

1. A method for rendering text onto moving image content, the method comprising:
    storing, in a provider computer system including at least one electronic processor and at least one data storage device, a master version of moving image content;
    generating, by a time-stamp module in the provider computer system, a time-stamped transcription of the master version of the moving image content, wherein generating the time-stamped transcription comprises:
    (i) generating a transcription of the master version of the moving image content comprising multiple segments,
    (ii) associating a starting time-stamp and an ending time-stamp with each segment of the multiple segments of the transcription, and
    (iii) storing, in the provider computer system, the generated transcription together with the associated starting and ending time-stamps for each segment of the multiple segments as a copy of the master version of the moving image content being reclassified as transcribed and time-stamped;
    providing access to the copy of the time-stamped transcription of the master version of the moving image content by multiple client devices associated with multiple translators,
    transmitting an interface to at least one of the multiple client devices, wherein the interface is programmed with instructions for:
    (i) requesting the copy of the time-stamped transcription of the master version of the moving image content, and
    (ii) receiving input text from a translator of the multiple translators, wherein the input text corresponds to a translation into a selected language of at least one associated starting and ending time-stamped segment of the multiple segments of the copy of the time-stamped transcription of the moving image content;
    receiving, in the provider computer system, a translation of the at least one segment of the multiple segments of the copy of the time-stamped transcription of the moving image content; and
    storing, in the provider computer system, the translation of the copy of the time-stamped transcription of the moving image content, wherein the stored translation is time-stamped to correspond with the time-stamped transcription and original dialog of the master version of the moving image content.

2. The method of claim 1, further comprising incorporating, with the provider computer system, at least one edit to a stored version of the translation of the copy of the time-stamped transcription of the moving image content.

3. The method of claim 1, further comprising: receiving a request in the provider computer system to view the moving image content with text rendered thereon; and in response to receiving the request: transmitting the translation of the copy of the time-stamped transcription of the moving image content, and transmitting the moving image content.

4. The method of claim 1, further comprising the interface programmed with instructions for: receiving the translation of the copy of the time-stamped transcription of the moving image content; receiving the moving image content; and superimposing text on the moving image content as the moving image content is received in association with the translation of the copy of the time-stamped transcription of the moving image content.

5. The method of claim 1, further comprising converting format of the moving image content into a different digital format.

6. The method of claim 1, wherein the interface is further programmed with instructions for selecting a language other than the language of the original dialog of the master version of the moving image content.

7. The method of claim 1, wherein at least one of the multiple client devices includes a network-enabled client device.

8. A method for transcribing dialog associated with moving image content, the method comprising:
   storing, in a provider computer system including at least one electronic processor and at least one data storage device, a master version of moving image content;
   providing access to a copy of the master version of the moving image content by multiple client devices associated with multiple transcribers;
   transmitting an interface to at least one of the multiple client devices, wherein the interface is programmed with instructions for:
   (i) requesting the copy of the master version of the moving image content from the provider computer system,
   (ii) interactively playing the moving image content,
   (iii) receiving input data representative of a transcription of the dialog associated with the master version of the moving image content, and
   (iv) receiving input data indicative of at least one starting time-stamp and at least one ending time-stamp for at least one segment of multiple segments of the transcription;
   receiving, in the provider computer system, the transcription of the at least one segment of the multiple segments, the input data indicative of the at least one starting time-stamp, and the at least one ending time-stamp for the at least one segment of the multiple segments of the transcription of the dialog associated with the master version of the moving image content; and
   storing, in the provider computer system, the transcription together with the starting and ending time-stamps for each segment of the multiple segments as a copy of the master version of the moving image content being reclassified as transcribed and time-stamped.

9. The method of claim 8, further comprising receiving, in the provider computer system from at least one of the multiple client devices, a request to time-stamp a transcription of the dialog associated with the master version of the moving image content.

10. The method of claim 9, further comprising transmitting the transcription of the dialog associated with the master version of the moving image content and the interface to the client device.

11. The method of claim 8, wherein the interface is further programmed with a plurality of interactive elements.

12. The method of claim 11, wherein the plurality of interactive elements includes at least one interactive element selected from the group consisting of dialog begins button, dialog ends button, play clock, and language selector.

13. The method of claim 8, further comprising receiving in the provider computer system at least one time-stamp from at least one of the multiple client devices.

14. The method of claim 8, wherein at least one of the multiple client devices includes a network-enabled mobile phone or a personal digital assistant.

15. A system for rendering text onto moving image content, the system comprising:
   a provider computer system including at least one electronic processor and at least one data storage device, the provider computer system programmed for:
   storing a master version of moving image content;
   generating a time-stamped transcription of the master version of the moving image content, wherein generating the time-stamped transcription comprises:
   (i) generating a transcription of the master version of the moving image content comprising multiple segments,
   (ii) associating a starting time-stamp and an ending time-stamp with each segment of the multiple segments of the transcription, and
   (iii) storing, in the provider computer system, the generated transcription together with the associated starting and ending time-stamps for the each segment of the multiple segments as a copy of the master version of the moving image content being reclassified as transcribed and time-stamped;
   providing access to the copy of the time-stamped transcription of the master version of the moving image content by multiple client devices associated with multiple translators;
   transmitting an interface to at least one of the multiple client devices, wherein the interface is programmed with instructions for:
   (i) requesting the copy of the time-stamped transcription of the master version of the moving image content, and
   (ii) receiving input text from a translator of the multiple translators, wherein the input text corresponds to a translation into a selected language of at least one associated starting time-stamped and ending time-stamped segment of the multiple segments of the copy of the time-stamped transcription of the moving image content;
   receiving a translation of the at least one segment of the multiple segments of the copy of the time-stamped transcription of the moving image content; and
   storing the translation of the copy of the time-stamped transcription of the moving image content, wherein the stored translation is time-stamped to correspond with the time-stamped transcription and original dialog of the master version of the moving image content.

16. A system for transcribing dialog associated with moving image content, the system comprising:
   a provider computer system including at least one electronic processor and at least one data storage device, the provider computer system programmed for:
   storing a master version of moving image content;
   providing access to a copy of the master version of the moving image content by multiple client devices associated with multiple transcribers;
   transmitting an interface to at least one of the multiple client devices, wherein the interface is programmed with instructions for:
   (i) requesting the copy of the master version of the moving image content from the provider computer system,
   (ii) interactively playing the moving image content, (iii) receiving input data representative of a transcription of the dialog associated with the master version of the moving image content, and
(iv) receiving input data indicative of at least one starting time-stamp and at least one ending time-stamp for at least one segment of multiple segments of the transcription;

receiving, in the provider computer system, the transcription of the at least one segment of the multiple segments, the input data indicative of the at least one starting time-stamp, and the at least one ending time-stamp for the at least one segment of the multiple segments of the transcription of the dialog associated with the master version of the moving image content; and storing, in the provider computer system, the transcription together with the starting and ending time-stamps for each segment of the multiple segments as a copy of the master version of the moving image content being reclassified as transcribed and time-stamped.

17. The system of claim 16, wherein the provider computer system is further programmed to receive a request to time-stamp a transcription of the dialog associated with the master version of the moving image content.

\* \* \* \* \*